United States Patent
Urban, Jr. et al.

(10) Patent No.: US 8,844,231 B2
(45) Date of Patent: Sep. 30, 2014

(54) SHIM DEVICE AND METHOD OF FLOOR LEVELING

(71) Applicants: Richard W. Urban, Jr., Braidwood, IL (US); Steven E. Urban, Wilmington, IL (US)

(72) Inventors: Richard W. Urban, Jr., Braidwood, IL (US); Steven E. Urban, Wilmington, IL (US)

(*) Notice: Subject to any disclaimer, the term of this patent is extended or adjusted under 35 U.S.C. 154(b) by 0 days.

(21) Appl. No.: 13/660,593

(22) Filed: Oct. 25, 2012

(65) Prior Publication Data
US 2013/0104481 A1 May 2, 2013

Related U.S. Application Data

(60) Provisional application No. 61/552,667, filed on Oct. 28, 2011.

(51) Int. Cl.
| | |
|---|---|
| *E04F 15/22* | (2006.01) |
| *E04B 2/00* | (2006.01) |
| *E04C 3/00* | (2006.01) |
| *A47G 27/04* | (2006.01) |

(52) U.S. Cl.
USPC .............. 52/459; 52/396.1; 52/417; 16/7

(58) Field of Classification Search
CPC . E04F 15/02005; E04F 19/063; E04F 19/062; A47G 27/04; A47G 27/045; A47G 27/0462; E06B 1/70; E06B 2001/70
USPC ......... 52/393, 396.02, 396.04, 396.05, 396.1, 52/417, 448, 716.3, 287.1, 459, 460, 465; 428/119; 16/7, 16
See application file for complete search history.

(56) References Cited

U.S. PATENT DOCUMENTS

| | | | | |
|---|---|---|---|---|
| 2,980,943 | A * | 4/1961 | Calandro et al. | 16/7 |
| 4,893,449 | A * | 1/1990 | Kemper | 52/464 |
| 5,423,154 | A * | 6/1995 | Maylon et al. | 52/371 |
| 5,661,874 | A * | 9/1997 | Latour | 16/4 |
| 5,756,176 | A * | 5/1998 | Feld | 428/48 |
| 6,038,733 | A * | 3/2000 | Carder et al. | 16/16 |
| 6,238,773 | B1 * | 5/2001 | Schluter | 428/192 |
| 6,357,192 | B1 * | 3/2002 | Schluter | 52/459 |
| 7,150,134 | B2 * | 12/2006 | Kornfalt et al. | 52/416 |
| 7,797,900 | B2 * | 9/2010 | Sondermann | 52/466 |
| 2002/0095895 | A1 * | 7/2002 | Daly et al. | 52/464 |
| 2005/0189723 | A1 * | 9/2005 | Chassee | 277/411 |
| 2008/0127592 | A1 * | 6/2008 | Knapp | 52/465 |
| 2012/0180418 | A1 * | 7/2012 | Schacht | 52/468 |
| 2012/0210650 | A1 * | 8/2012 | Rissone | 49/468 |
| 2012/0324817 | A1 * | 12/2012 | Stanchfield | 52/464 |

* cited by examiner

*Primary Examiner* — Ryan Kwiecinski
(74) *Attorney, Agent, or Firm* — Ladas & Parry LLP

(57) ABSTRACT

A shim device and method of using the same are described in which the shim device includes a horizontal flange, a vertical web and a ledge web. The vertical web of the shim device includes a bottom end, a middle portion and a top end in which the bottom of the vertical web is attached to the horizontal flange such that the vertical web is aligned substantially perpendicular to the horizontal flange. The ledge web of the shim device is attached to the middle portion of the vertical web such that the ledge web is aligned substantially perpendicular to the vertical web and aligned substantially parallel to the horizontal flange. The method of using the same includes the steps of steps of applying, mounting and finishing the leveled floor.

17 Claims, 2 Drawing Sheets

SHIM DEVICE AND METHOD OF FLOOR LEVELING

CLAIM OF PRIORITY

This application claims priority based upon U.S. Provisional Application Ser. No. 61/552,667 filed Oct. 28, 2011, entitled Shim Device and Method of Floor Leveling.

FIELD OF THE INVENTION

The present invention relates to leveling devices, more particularly to a shim device for use in leveling dissimilar flooring surfaces together.

BACKGROUND

Matching dissimilar flooring surfaces at a juncture, i.e., an interface, between the flooring surfaces is desirable and useful. Uneven flooring surfaces pose encumbrances to wheeled devices, such as food trays, wheel chairs and office equipment. Different floor coverings such as different tiles like ceramic and vinyl, solid wood and wood laminates, and carpeting of different heights, have different thicknesses and require transition such as between rooms or between selected floor areas. Therefore, a need exists for a new and improved shim device and a method of using the same for use in smoothly interfacing dissimilar flooring surfaces. The prior art generally provides only a rigid barrier between two dissimilar surfaces without providing a calibrated means to level and transition on one side to a disproportionate height and floor covering thickness compared to the other side.

SUMMARY OF THE INVENTION

The present shim device, kit and method of using, according to the principles of the present invention, provide a novel and convenient way of realizing a substantially smooth interface between dissimilar flooring surfaces. The device includes a horizontal flange, a vertical web and a ledge web. The vertical web of the shim device includes a bottom end, a middle portion and a top end in which the bottom of the vertical web is attached to the horizontal flange such that the vertical web is aligned substantially perpendicular to the horizontal flange. The ledge web of the shim device is attached to the middle portion of the vertical web such that the ledge web is aligned substantially perpendicular to the vertical web and aligned substantially parallel to the horizontal flange. In one embodiment the shim could be included in a kit, which kit also includes a floor leveling composition, and an additive. The method of using the same includes the steps of steps of applying, interfacing, mixing, mounting, and assembling.

There has thus been outlined, rather broadly, the more important features of the invention in order that the detailed description thereof that follows may be better understood, and in order that the present contribution of the art may be better appreciated.

The shim device invention may also include an optional leg flange and optional spacer flange.

Numerous aspects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

There has thus been outlined, rather broadly, the more important features of the invention in order that the detailed description thereof that follows may be better understood, and in order that the present contribution of the art may be better appreciated.

BRIEF DESCRIPTION OF THE DRAWINGS

The invention will be better understood and aspects other than those set forth above will become apparent when consideration is given to the following detailed description thereof. Such description makes reference to the annexed drawings wherein.

The same reference numerals refer to the same elements throughout the various figures, recognizing that different embodiments may have different traits as shown and described.

DETAILED DESCRIPTION OF THE PREFERRED EMBODIMENT

Figure 1:
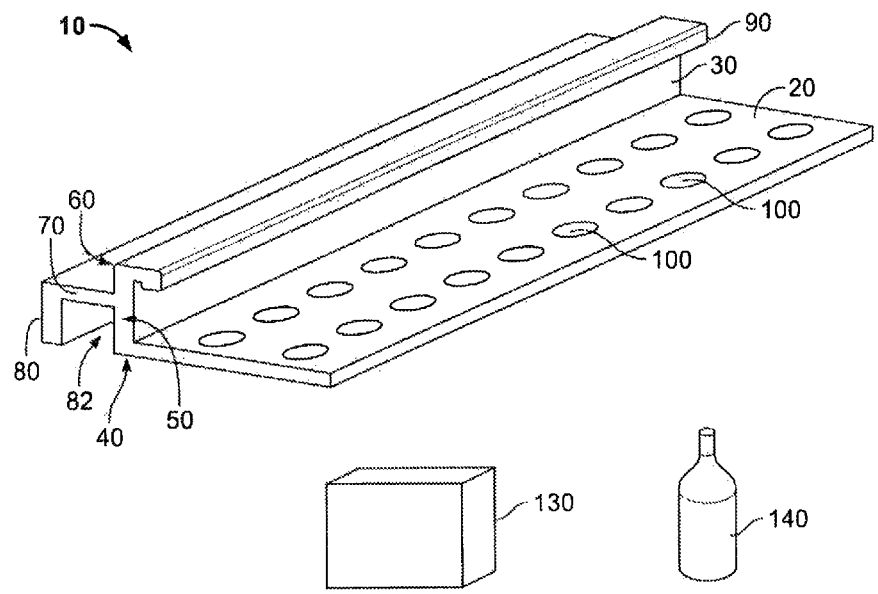
FIG. 1 is a perspective view of an embodiment of the shim device in a kit of the present invention.
Figure 2:
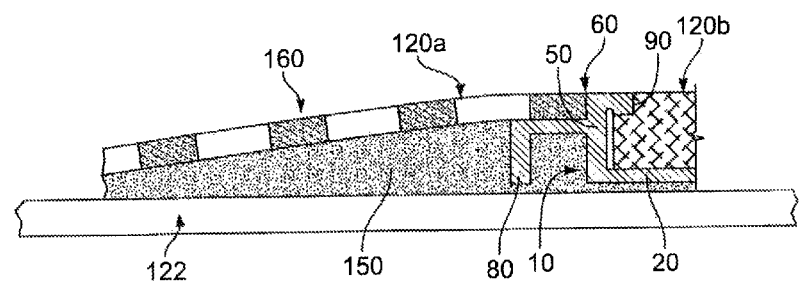
FIG. 2 is a cross section exaggerated view of the kit of the device of the present invention interfaced between two dissimilar flooring surfaces.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. Accordingly, the detailed discussion herein of one or more embodiments is not intended, nor is to be construed, to limit the metes and bounds of the patent protection afforded the present invention, in which the scope of patent protection is intended to be defined by the claims and their equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention. Further yet, the drawings are not necessarily to scale and in some instances proportions may have been exaggerated in order to more clearly depict certain features of the invention.

Further, it should be understood that, although steps of various the claimed method may be shown and described as being in a sequence or temporal order, the steps of any such method are not limited to being carried out in any particular sequence or order, absent an indication otherwise. That is, the claimed method steps are to be considered to be capable of being carried out in any sequential combination or permutation order while still falling within the scope of the present invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Shim device 10 comprises a horizontal flange 20, a vertical web 30 and a ledge web 70. The vertical web 30 comprises a bottom end 40, a middle portion 50 and a top end 60 in which the bottom of the vertical web 30 is attached to the horizontal flange 20 such that the vertical web 30 is aligned substantially perpendicular to the horizontal flange 20. The ledge web 70 is attached to the middle portion 50 of the vertical web 30 such that the ledge web 70 is aligned substantially perpendicular to the vertical web 30 and aligned substantially parallel to the horizontal flange 20.

The shim device 10 can also include a leg flange 80 attached to the ledge web 70 in which the optional leg flange 80 may be substantially parallel to the vertical web 30. Vertical web 30, and particularly bottom end 40 and middle portion 50, along with ledge web 70 and leg flange 80 define a cavity 82 between them, opening downwardly.

Figure 3:
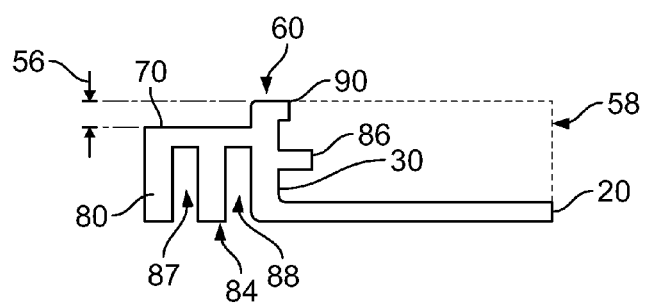
FIG. 3 is an elevational view of an embodiment of the shim device.
Figure 4:
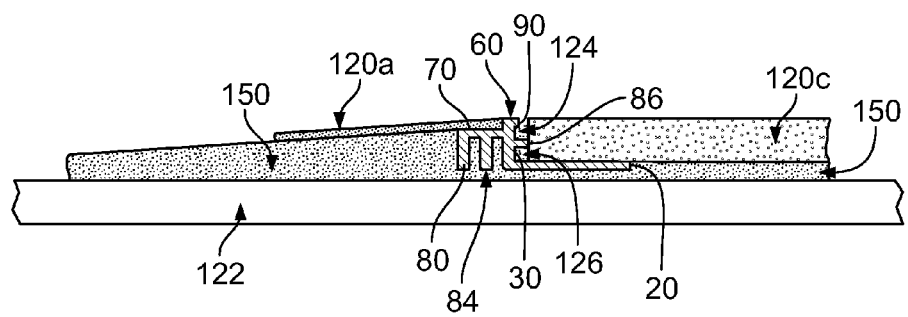
FIG. 4 is a cross section view of the kit of the device of the present invention interfaced between a different two flooring surfaces.

As shown in FIG. 3 and FIG. 4, an intermediate leg flange 84 may be used for improved vertical strength in alternative embodiments. Vertical web 30, and particularly bottom end 40 and middle portion 50, along with ledge web 70 and leg flange 80 with intermediate leg flange 84 defines two cavities 87, 88, between them, opening downwardly.

Cavities 82, 87, 88 provide structural advantages in that flanges and webs can provide the structural support for the floor transition between different flooring surfaces 120a, 120b or 120c, without the unnecessary material, including cost and weight, that would be present in a solid transition. Additionally, should transition strip 10 be bedded in uncured compound 150, the viscous nature of compound 150, prior to curing or drying, will permit flow upwardly into cavities 82, 87, 88, and after curing or drying, the essentially solid compound will provide additional mechanical and adhesive affixation of strip 10 to substrate 122. Alternatively, adhesively affixing transition strip 10 to cured compound will also provide flow into cavities 82, 87, 88 of an adhesive.

Particularly when adapting to a floor covering such as a ceramic tile, 120c, which typically requires grouting the insterstices between individual tiles, an intermediate spacer flange 86 can provide desirable consistent spacing—defining a cavity 124 adapted to receive permitting grouting 126 between the tile and vertical web 30.

The shim device 10 may also include an overhanging lip 90 attached to the top end 60 of the vertical web 30. The horizontal flange 20 may include a plurality of holes 100. The top end 60 of the vertical web 30 may be rounded.

The shim device 10 may be composed of any known commercially available material such as those materials selected from the group consisting of metal, plastic, and wood, or composites thereof such as fiber reinforced plastic, like fiberglass, in which reinforcing fibers, particles, aggregates or the like are used, whether, natural, mineral, or plastics having different properties. The metal may be selected from the group consisting of actinium, aluminum, americium, antimony, beryllium, bismuth, brass, bronze, cadmium, californium, chromium, cobalt, copper, dubnium, dysprosium, erbium, europium, fermium, francium, gadolinium, germanium, gold, hafnium, iron, lanthanum, lead, magnesium, manganese, mercury, molybdenum, neodymium, nickel, niobium, osmium, palladium, platinum, potassium, rhenium, rhodium, ruthenium, selenium, silicon, silver, sodium, strontium, steel, stainless steel, tantalum, thorium, tin, titanium, tungsten, vanadium, zinc, zirconium and mixtures thereof, or any other materials having the desirable material properties. The plastic may be selected from the group consisting of aromatic polymers, hexafluoropropylene, hexamethylene diamine adipic acid polymers, isobutylene-isoprene polymer, linoleum, phenol polymers, polyacetals, polyacrylates, polyamides, aromatic polyamides, polybutylene, polycaprolactan, polycarbonate, polycarbonates, polydienes, polydimethylsiloxane, polylactic-co-glycolic acid), polyepoxy, polyesters, polyethylene oxides, polyethylene terephthalate (PET), polyethylene, polyimide, polymethacrylates, polymethylmethacrylate, polyolefins, halogenated polyolefins, polypropylene, polysaccharides, polysiloxanes, polystyrene, polysulfides, polytetrafluoroethylene, polyurethanes, polyvinylbromide, polyvinylchloride, silicone rubber, trinitrotrimethylenetriamine, vinylester, vinylidene fluoride and combinations thereof, or any other materials having the desirable material properties. The wood may be selected from the group consisting of alder, apple, ash, azobé, bamboo, beech, birch, cedar, cherry, chestnut, elm, fir, hemlock, hickory, holly, iroko, Keruing, larch, mahogany, maple, merbau, mesquite, oak, okoumé, pear, pine, redwood, sassafras, spruce, teak, walnut, willow, yew, and composites thereof, or any other materials having the desirable material properties.

One preferred embodiment of the kit 110 for providing a transition between dissimilar flooring surfaces 120(a, b, or c) together includes a shim device 10, a floor leveling composition 130, and depending on the properties of the composition 130, an additive 140. The shim device 10 of the kit 110 may comprise; a horizontal flange 20; a vertical web 30 comprising: a bottom end 40; a middle portion 50; and a top end 60.

The bottom of the vertical web 30 is attached to the horizontal flange 20 such that the vertical web 30 is aligned substantially perpendicular to the horizontal flange 20. Ledge web 70 is attached to the middle portion 50 of the vertical web 30 such that the ledge web 70 is aligned substantially perpendicular to the vertical web 30 and aligned substantially parallel to the horizontal flange 20. Leg flange 80 attached to the ledge web 70 which will provide support by bearing on the underlying structural floor or substrate, or being bonded with leveling compound 130. Top flange portion 56 of web 30 extends above ledge web 70 and defines a first floor covering height. In one embodiment overhanging lip 90 is attached to the top flange portion 56 proximate top end 60 of the vertical web 30. A second floor covering height is defined by the distance between top horizontal flange 20 and top end 60.

The floor leveling composition 130 of the kit 110 may be any commercially available floor leveling composition 130 such as being a cement mixture, a clay mixture or a synthetic mixture. The cement mixture of the floor leveling composition 130 of the kit 110 can be selected from the group consisting of minerals or synthetics. The group of minerals can be cementitous, such as portland cement, fly cement, fly ash and admixtures thereof, or clay, such as a clay selected from the group consisting of beidellite, nontronite, hectorite, saponite, attapulgite, sepiolite, bentonite, sand, and admixtures thereof. The synthetic mixture of the floor leveling composition 130 of the kit 110 can be selected from the group consisting of aromatic polymers, hexafluoropropylene, hexamethylene diamine adipic acid polymers, isobutylene-isoprene polymer, phenol polymers, polyacetals, polyacrylates, polyamides, aromatic polyamides, polybutylene, polycaprolactan, polycarbonate, polycarbonates, polydienes, polydimethylsiloxane, poly(lactic-co-glycolic acid), polyepoxy, polyesters, polyethylene oxides, polyethylene terephthalate (PET), polyethylene, polyimide, polymethacrylates, polymethylmethacrylate, polyolefins, halogenated polyolefins, polypropylene, polysaccharides, polysiloxanes, polystyrene, polysulfides, polytetrafluoroethylene, polyurethanes, polyvinylbromide, polyvinylchloride, silicone rubber, trinitrotrimethylenetriamine, vinylester, vinylidene fluoride and combinations thereof and one of said plastics in combination with reinforcing materials. In particular, polyepoxies may include epoxy polymer, water dispersible epoxy polymer, a water compatible polyamine epoxy resin adduct as the curing agent. A variety of other thermosetting plastics such as catalyzed polyester resin or vinylester resin may be suitable, having appropriate leveling, curing and durability properties.

The additive 140 of the kit 110 may be any commercially available additive 140 such as those selected from the group consisting of water, isopropyl alcohol, a phosphate salt, a pyrophosphate salt, an organophosphate salt, a phosphonate salt, a tannin, a lignite, a lignosulfonate salt, polyethylene wax, a silicon containing emulsion, silicon based fibers or particulates, a variety of particulates such wood flour, talc, perlite, other calcium carbonates forms, microballoons, or formed or ground natural or synthetic fibers, and mixtures thereof. Depending on the materials, the additive may provide either chemical or mechanical properties as a result of the combination with the floor leveling composition, or both. Additionally, it will be understood that from time to time a leveling compound may be supplied in complete form, previously combining a floor leveling composition such as a cement or a synthetic resin, and an additive such as sand, talc, or other additives, in a unitary mixture such as might be installed by simply applying from a container or the like. Additive can be chosen to improve flow for leveling, to add bulk, improve tensile strength such as by reinforcement, improved adhesion or a combination of these attributes.

One preferred embodiment of a method of transitioning between dissimilar flooring surfaces 120a, 120b or 120c comprises the steps of applying, interfacing, mixing, mounting, and assembling. The assembling step comprises assembling a kit 110 comprising: a shim device 10 comprising: a horizontal flange 20; a vertical web 30 comprising: a bottom end 40; a middle portion 50; and a top end 60; and an overhanging lip 90 attached to the top end 60 of the vertical web 30, wherein the bottom of the vertical web 30 is attached to the horizontal flange 20 such that the vertical web 30 is aligned substantially perpendicular to the horizontal flange 20; and a ledge web 70 attached to the middle portion 50 of the vertical web 30 such that the ledge web 70 is aligned substantially perpendicular to the vertical web 30 and aligned substantially parallel to the horizontal flange 20; and a leg flange 80 attached to the ledge web 70; a floor leveling composition 130; and an additive 140.

The interfacing step comprises interfacing the shim device 10 between the dissimilar flooring surfaces 120(a, b, or c). The securing step comprises securing the interfaced shim device 10 between the dissimilar flooring surfaces 120(a, b, or c). The mixing step comprises mixing together the floor leveling composition 130 with the additive 140 to form a leveling compound 150. The applying step comprises applying a portion of the leveling compound 150 onto at least one of the flooring surfaces 120(a, b, or c). The mounting step comprises mounting floor tile 160 such as, but not limited to, vinyl in sheet flooring or tile form, onto the applied leveling compound to substantially level off the dissimilar flooring surfaces 120(a, b, or c).

In alternative embodiments different compounds may be used in keeping with the particular floor coverings. For example the shim device 10 might be affixed with appropriate mortar to an underlying floor or substrate and tile similarly bonded on one side, while a combination of leveling compound and overlying adhesive and vinyl tile on the other. A transition to carpeting could also be adapted. The geometry of flange 10 permits wide adaptation to different floor coverings.

The shim may be formed an arranged with geometry particularly adapted to anticipated flooring conditions. For example, the first floor covering height having a height 56 that is from the top of the ledge to of top end 60 over web 70 may be within a range from as little as 0.080 mm (0.0031 in) to 6.35 mm (0.25 in) and may typically be provided in selected, customary construction industry fractional dimensions such as the above mentioned one quarter inch height, one eighth inch height (0.125 inch or 3.18 millimeters) and one sixteenth inch height (0.0625 inch or 1.59 millimeters). It will be understood that the decimal dimensions provided here are provided for uniformity and the not to limit any ranges to significant figures to levels of precision of three or four decimal places. The desired first floor covering height 56 can be selected based on the thickness of the floor tile expected to cover web Similarly, the total height of vertical web 30, from horizontal flange 20 to top end 60 can be selected from a range of desired second floor covering heights 58 preferably one quarter inch (0.25 inch or 6.35 mm) or one half inch (0.5 inch or 12.7 mm).

As to the manner of usage and operation of the present invention, the same should be apparent from the above description. Accordingly, no further discussion relating to the manner of usage and operation will be provided.

While a number of exemplary embodiments of the shim device, kit and method of using same have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shim device comprising:
   a horizontal flange;
   a vertical web comprising:
   a bottom end;
   a middle portion; and
   a top end having an overhanging lip, wherein the bottom end of the vertical web is attached to the horizontal flange such that the vertical web is aligned perpendicular to the horizontal flange; and
   a horizontal ledge having a top and a bottom formed proximate the middle portion of the vertical web such that the ledge is aligned perpendicular to the vertical web and aligned parallel to and spaced above the horizontal flange;
   wherein the overhanging lip of the top end is attached to a first floor covering having a first thickness equal to a height of the first floor covering, the overhanging lip attached to the first floor covering at the height, the first floor covering configured to overly the horizontal flange;

wherein a second floor covering directly attaches to the top of the ledge while continually maintaining a level floor with the first floor covering along a total length of the shim device that is attached to the first floor covering;

wherein the second floor covering having a second thickness the same as a distance between the top end and the top of the ledge, wherein the first thickness is different that the second thickness, and wherein each of a top of the first floor covering and a top of the second floor covering are at a same height as the top end.

2. The shim device of claim 1 further comprising the top end being formed to extend above said horizontal ledge a distance between 0.080 mm to 6.35 mm.

3. The shim device of claim 2 further comprising the top end being formed to extend above the horizontal flange a distance between 6.35 mm to 12.7 mm.

4. The shim device of claim 1, further comprising a leg flange attached to the horizontal ledge.

5. The shim device of claim 4, wherein the leg flange is parallel to the vertical web.

6. The shim device of claim 1, wherein the horizontal flange comprises a plurality of holes.

7. The shim device of claim 1, wherein the shim device is composed of materials selected from the group consisting of metal, plastic, mineral and wood.

8. The shim device of claim 1, wherein the shim device is composed of metal selected from the group consisting of actinium, aluminum, americium, antimony, beryllium, bismuth, brass, bronze, cadmium, californium, chromium, cobalt, copper, dubnium, dysprosium, erbium, europium, fermium, francium, gadolinium, germanium, gold, hafnium, iron, lanthanum, lead, magnesium, manganese, mercury, molybdenum, neodymium, nickel, niobium, osmium, palladium, platinum, potassium, rhenium, rhodium, ruthenium, selenium, silicon, silver, sodium, strontium, steel, stainless steel, tantalum, thorium, tin, titanium, tungsten, vanadium, and zinc, zirconium.

9. The shim device of claim 1, wherein the shim device is composed of plastic selected from the group consisting of aromatic polymers, hexafluoropropylene, hexamethylene diamine adipic acid polymers, isobutylene-isoprene polymer, phenol polymers, polyacetals, polyacrylates, polyamides, aromatic polyamides, polybutylene, polycaprolactan, polycarbonate, polycarbonates, polydienes, polydimethylsiloxane, poly(lactic-co-glycolic acid), polyepoxy, polyesters, polyethylene oxides, polyethylene terephthalate (PET), polyethylene, polyimide, polymethacrylates, polymethylmethacrylate, polyolefins, halogenated polyolefins, polypropylene, polysaccharides, polysiloxanes, polystyrene, polysulfides, polytetrafluoroethylene, polyurethanes, polyvinylbromide, polyvinylchloride, silicone rubber, trinitrotrimethylenetriamine, vinylester, and vinylidene fluoride.

10. The shim device of claim 1, wherein the shim device is composed of wood selected from the group consisting of alder, apple, ash, azobé, bamboo, beech, birch, cedar, cherry, chestnut, elm, fir, hemlock, hickory, holly, iroko, Keruing, larch, mahogany, maple, merbau, mesquite, oak, okoumé, pear, pine, redwood, sassafras, spruce, teak, walnut, willow, and yew.

11. The shim device of claim 1, wherein the first floor covering and the second floor covering are formed from a plastic, ceramic, carpet, or wood.

12. A device for leveling dissimilar flooring surfaces together comprising:
a shim device comprising:
a horizontal flange;
a vertical web comprising:
a bottom end;
a middle portion; and
a top end having an overhanging lip, wherein the bottom end of the vertical web is attached to the horizontal flange such that the vertical web is aligned perpendicular to the horizontal flange; and
a horizontal ledge having a top and a bottom attached to the middle portion of the vertical web such that the ledge is aligned perpendicular to the vertical web and aligned parallel to and spaced above the horizontal flange;
a leg flange attached to the ledge,
wherein the overhanging lip of the top end is attached to a first floor covering having a first thickness equal to a height of the first floor covering, the overhanging lip attached to the first floor covering at the height, the first floor covering configured to overly the horizontal flange;
wherein a second floor covering directly attaches to the top of the ledge while continually maintaining a level floor with the first floor covering along a total length of the shim device that is attached to the first floor covering;
wherein the second floor covering having a second thickness the same as a distance between the top end and the top of the ledge,
wherein the first thickness is different that the second thickness, and
wherein each of a top of the first floor covering and a top of the second floor covering are at a same height as the top end.

13. The device of claim 12, wherein the device is affixed to a floor leveling composition comprising a cement mixture selected from the group consisting of portland cement, fly cement, and fly ash.

14. The device of claim 12, wherein the device is affixed to a floor leveling composition comprising a clay mixture selected from the group consisting of beidellite, nontronite, hectorite, saponite, attapulgite, sepiolite, bentonite, and sand.

15. The device of claim 12 wherein the device is affixed to a floor leveling composition comprising a synthetic mixture selected from the group consisting of aromatic polymers, hexafluoropropylene, hexamethylene diamine adipic acid polymers, isobutylene-isoprene polymer, phenol polymers, polyacetals, polyacrylates, polyamides, aromatic polyamides, polybutylene, polycaprolactan, polycarbonate, polycarbonates, polydienes, polydimethylsiloxane, poly(lactic-co-glycolic acid), polyepoxy, polyesters, polyethylene oxides, polyethylene terephthalate (PET), polyethylene, polyimide, polymethacrylates, polymethylmethacrylate, polyolefins, halogenated polyolefins, polypropylene, polysaccharides, polysiloxanes, polystyrene, polysulfides, polytetrafluoroethylene, polyurethanes, polyvinylbromide, polyvinylchloride, silicone rubber, trinitrotrimethylenetriamine, vinylester, vinylidene fluoride, a water dispersible epoxy polymer and a water compatible polyamine epoxy resin adduct as the curing agent.

16. The device of claim 12, wherein the device receives the second floor covering overlying the ledge and the second floor overlying the horizontal flange;
the height from the ledge to the top end of the vertical web is adapted to receive the second floor covering;
the second floor covering is formed of plastic, ceramic, carpet, or wood having the second thickness;

the height from the horizontal flange to the top end of the vertical web is adapted to receive the first floor covering, and the first floor covering is formed of plastic, ceramic, carpet, or wood having the first thickness.

17. A method of leveling dissimilar flooring surfaces together, the method comprising:
 obtaining a shim device comprising:
 a horizontal flange;
 a vertical web comprising:
 a height;
 a bottom end;
 a middle portion; and
 a top end having an overhanging lip, wherein the bottom end of the vertical web is attached to the horizontal flange such that the vertical web is aligned perpendicular to the horizontal flange; and
 a horizontal ledge having a top and a bottom attached to the middle portion of the vertical web such that the ledge is aligned perpendicular to the vertical web and aligned parallel to and spaced above the horizontal flange;
 a leg flange attached to the horizontal ledge;
 obtaining a floor leveling composition;
 applying the floor leveling composition to a substrate;
 affixing the shim device to the composition and on the substrate so as to separate the dissimilar flooring surfaces;
 wherein the overhanging lip of the top end is attached to a first floor covering having a first thickness equal to a height of the first floor covering, the overhanging lip attached to the first floor covering at the height, the first floor covering configured to overly the horizontal flange;
 wherein a second floor covering directly attaches to the top of the ledge while continually maintaining a level floor with the first floor covering along a total length of the shim device that is attached to the first floor covering;
 wherein the second floor covering having a second thickness the same as a distance between the top end and the top of the ledge,
 wherein the first thickness is different that the second thickness, and
 wherein each of a top of the first floor covering and a top of the second floor covering are at a same height as the top end.

* * * * *